United States Patent [19]

Pickles et al.

[11] 3,932,505

[45] Jan. 13, 1976

[54] HYDRAZIDE SALTS

[75] Inventors: Wilfred Pickles; Eric Keith Baylis, both of Stockport, England

[73] Assignee: Ciba-Geigy Corporation, Ardsley, N.Y.

[22] Filed: Jan. 4, 1974

[21] Appl. No.: 430,843

[30] Foreign Application Priority Data
Jan. 6, 1973 United Kingdom............... 908/73
May 9, 1973 United Kingdom............ 22108/73

[52] U.S. Cl............ 260/559 H; 260/559 S; 423/24; 423/99; 423/139
[51] Int. Cl.² ................................. C07C 103/26
[58] Field of Search..................... 260/559 H, 559 S

[56] References Cited
UNITED STATES PATENTS
2,716,663 8/1955 Beman........................... 260/559 H
2,763,684 9/1956 Beman........................... 260/559 H OTHER PUBLICATIONS
Beilsteins Handbuch Der Organischen Chemie, Vol. X, p. 161 (1971).
Issa et al., 2. Anorg. Allq. Chem., 354, 90 (1967).
Shome et al., Anal. Chim Acta, 32(4), 400 (1965).

*Primary Examiner*—C. Davis
*Attorney, Agent, or Firm*—Luther A. R. Hall

[57] ABSTRACT
A compound having the general formula

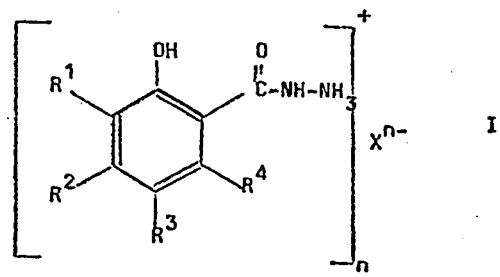

in which $R^1$, $R^2$, $R^3$ and $R^4$ may be the same or different and represent hydrogen, a straight or branched chain alkyl radical having 1 to 20 carbon atoms, an aralkyl radical having 7 to 20 carbon atoms which may be substituted by one or more alkyl groups having 1 to 4 carbon atoms, or may be of the type:

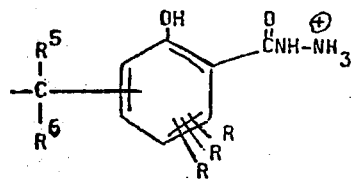

wherein $R^5$ and $R^6$ are each a hydrogen atom or a methyl group, and each R represents the others of $R^1$, $R^2$, $R^3$ and $R^4$, an alkenyl radical having 2 to 20 carbon atoms; a cycloalkyl radical having 5 to 12 carbon atoms which may be substituted by one or more alkyl groups having 1 to 4 carbon atoms; an aryl radical having 6 to 10 carbon atoms; an alkaryl radical having 7 to 12 carbon atoms; a cyclohexyl alkyl radical in which the alkyl moiety has 2 or 3 carbon atoms and the cyclohexenyl ring may contain a methyl group as substituent; an alkenyl cyclohexyl radical in which the alkenyl moiety has 2 or 3 carbon atoms and the cyclohexyl ring may also contain a methyl group as substituent; or a group $-OR^7$ wherein $R^7$ represents an alkyl radical having 1 to 20 carbon atoms, a cycloalkyl radical having 5 to 12 carbon atoms, optionally substituted by one or more alkyl groups having 1 to 4 carbon atoms, an aryl radical having 6 to 10 carbon atoms or an alkenyl radical having 3 to 20 carbon atoms; or any two adjacent radicals $R^1$, $R^2$, $R^3$ and $R^4$ may be joined together to form an aryl ring which may be substituted by one or more alkyl groups having 1 to 20 carbon atoms; X represents an anion; and n is the valency of X, is useful for the extraction of metals from aqueous solutions.

11 Claims, No Drawings

HYDRAZIDE SALTS

The present invention relates to hydrazide derivatives of o-hydroxy carboxylic acids and to thier use in the extraction of metals from acid or alkaline solutions.

Recently the use of solvent extraction techniques for recovering metal values from aqueous solutions has been receiving increasing attention in the hydrometallurgical industry. This normally is a two stage process. In the first stage, the aqueous solution is mixed with a water immiscible organic liquid containing a metal complexing agent and the resulting metal complex migrates into the organic phase. In the second stage, the organic phase is mixed with an aqueous solution of a stripping agent such as sulphuric acid and the metal ion passes back to the new aqueous phase which may be more concentrated than the original aqueous solution and the metal values are then recovered, e.g. by electrolysis. The organic phase can then be recycled.

Various compounds, for example, o-hydroxy oximes, are known to be capable of extracting metals for example copper from acid solutions and their use is described, e.g. in British Pat. Specification No. 1091354. However, when the pH of the solution containing the metal drops to a value below 1.0, the efficiency of such compounds rapidly diminishes and the amount of metal extracted is very small. It is an object of the present invention to provide compounds which are capable of extracting metals from aqueous solutions having pH values ranging from high alkali values down to strong acid values of below 1.0.

In addition, the solutions generated from such ores or scrap also contain undesired metals in addition to the desired metal and it is necessary to use a compound which is selected for the desired metal and extracts it from solution into the organic phase leaving other undesired metals still in the aqueous solution. This is particularly important when copper is being extracted from acid solutions which also contain iron.

Accordingly the present invention provides a compound having the general formula (I):

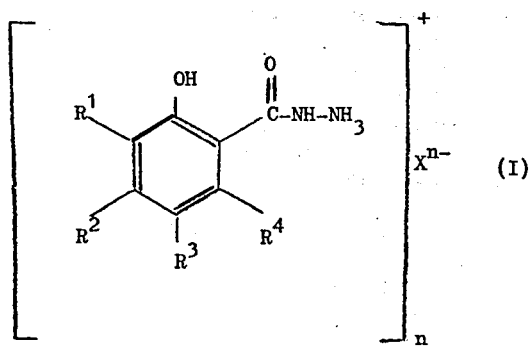

(I)

in which $R^1$, $R^2$, $R^3$ and $R^4$ may be the same or different and represent hydrogen; a straight or branched alkyl radical having 1 to 20 carbon atoms; an aralkyl radical having 7 to 20 carbon atoms which may be substituted by one or more alkyl groups having 1 to 4 carbon atoms, or may be of the type:

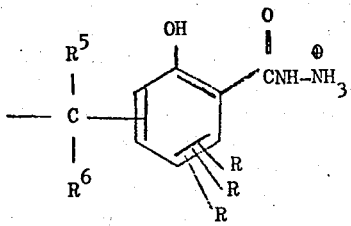

wherein $R^5$ and $R^6$ are each a hydrogen atom or a methyl group, and each R represents the others of $R^1$, $R^2$, $R^3$ and $R^4$, and $R^1$, $R^2$, $R^3$ and $R^4$ are furthermore an alkenyl radical having 2 to 20 carbon atoms; a cycloalkyl or cycloalkenyl radical having 5 to 12 carbon atoms which may be substituted by one or more alkyl groups having 1 to 4 carbon atoms; an aryl radical having 6 to 10 carbon atoms; an alkaryl radical having 7 to 12 carbon atoms; a cyclohexenyl alkyl radical in which the alkyl moiety has 2 or 3 carbon atoms and the cyclohexenyl ring may contain a methyl group as substituent; an alkenyl cyclohexyl radical in which the alkenyl moiety has 2 or 3 carbon atoms and the cyclohexyl ring may also contain a methyl group as substituent; or a group -$OR^7$ wherein $R^7$ represents an alkyl radical having 1 to 20 carbon atoms, a cycloalkyl radical having 5 to 12 carbon atoms, optionally substituted by one or more alkyl groups having 1 to 4 carbon atoms, an aryl radical having 6 to 10 carbon atoms and optionally substituted by alkyl with 1 to 4 carbon atoms, or an alkenyl radical having 3 to 20 carbon atoms, aralkyl; or any two adjacent radicals $R^1$, $R^2$, $R^3$ and $R^4$ may be jointed together to form a second aromatic ring which may be substituted by one or more alkyl groups having 1 to 20 carbon atoms; X represents an anion; and n is the valency of X.

Preferred compounds of general formula I are those in which $R^2$ and $R^4$ are both hydrogen and $R^1$ and $R^3$ are radicals other than hydrogen as set out above, especially alkyl groups.

When $R^1$, $R^2$, $R^3$, $R^4$ are alkyl radicals they may be, for example methyl, ethyl, n-propyl, iso-propyl, n-butyl, iso-butyl, sec-butyl, t-butyl, sec-amyl, t-amyl, n-hexyl, 1-ethyl-1-methylpropyl, 1,1-dimethylbutyl, 1-ethyl-1-methylpentyl, 1,1,3-trimethylpentyl, capryl, t-octyl, nonyl, 1,1,5-trimethylhexyl, n-decyl, n-undecyl, n-dodecyl, n-pentadecyl, n-hexadecyl, or n-octadecyl;

When $R^1$, $R^2$, $R^3$, $R^4$ are aralkyl radicals, they may be for example benzyl, α-methylbenzyl, αα-dimethylbenzyl or 3-hydrozido-4-hydroxybenzyl;

When $R^1$, $R^2$, $R^3$, $R^4$ are aryl radicals, they may be, for example phenyl or naphthyl.

When $R^1$, $R^2$, $R^3$, $R^4$ are cycloalkyl or cycloalkenyl radicals which may contain one or more alkyl groups, they may be, for example cyclopentyl, methylcyclopentyl, cyclohexyl, methylcyclohexyl, dimethylcyclohexyl or 1-isopropyl-4-methylcyclohex-3-en-1-yl.

When $R^1$, $R^2$, $R^3$, $R^4$ are alkaryl radicals, they may be, for example 4-tolyl, 3,4-xylyl, 4-isopropylphenyl or 2-methyl-4-t-butylphenyl.

When $R^1$, $R^2$, $R^3$, $R^4$ are radicals $-OR^7$ they may be, for example methoxy, ethoxy, n-hexoxy, n-decoxy, n-dodecoxy, n-octadecoxy, n-dodecenyloxy, cyclohexoxy, benzyloxy, phenoxy or p-isopropylphenoxy.

Where $R^1$, $R^2$, $R^3$, $R^4$ are alkenyl radicals, they may be, for example vinyl, allyl, hex-5-enyl, dec-9-enyl, or dodec-11-enyl. When an adjacent pair of $R^1$, $R^2$, $R^3$ and $R^4$ are joined together to form a fused benzene ring they maay produce for example 1-hydroxy-2-naphthoic hydrazide, 3-hydroxy-2-naphthoic hydrazide or 2-hydroxy-1-naphthoic hydrazide.

The anion X may be derived from an acid, preferably a mineral acid such as sulphuric, hydrochloric or phosphoric acid. The most preferred anion, however, is the divalent $SO_4^{--}$ ion, since the metal ion is normally in sulphuric acid during processing of metal ores.

The preferred hydrozide salts are those which are themselves soluble in the organic solvent as are their metal chelates. Generally this requires that the total number of carbon atoms in the radicals $R^1$, $R^2$, $R^3$ and $R^4$ should be more than 4 and preferably more than 8 to attain a reasonable solubility of both hydrazide salt and chelate in the hydrocarbon. The upper limit of carbon atoms in $R^1$, $R^2$, $R^3$ and $R^4$ can be as high as 30. These are not rigid limits since geometric arrangements and-/or different combinations of radicals $R^1$, $R^2$, $R^3$ and $R^4$ can affect the solubility of both hydrazide salt and chelate. Preferred compounds, therefore, are those in which $R^2$ and $R^4$ are both hydrogen since such compounds are easier and/or cheaper to synthesise and the sum of carbon atoms in $R^1$ and $R^3$ is more than 8 and up to 30. Mixtures of hydrazide salts can be used successfully if desired.

Representative hydrazides which are used in the form of their salts of the general formula I are:

Where $R^1$, $R^2$, $R^3$ and $R^4$ are alkyl singly or in combination:
2-hydroxy-5-isopropylbenzoic hydrazide sulphate
2-hydroxy-5-sec-butylbenzoic hydrazide sulphate
2-hydroxy-5-sec-amylbenzoic hydrazide sulphate
2-hydroxy-5-t-amylbenzoic hydrazide sulphate
2-hydroxy-5-(1-ethyl-1-methylpropyl)benzoic hydrazide sulphate
2-hydroxy-5-(1,1-dimethylbutyl)benzoic hydrazide sulphate
2-hydroxy-5-(1,1,3-trimethylpentyl)benzoic hydrazide sulphate
2-hydroxy-5-(1,1,5-trimethylhexyl)benzoic hydrazide hydrochloride
2-hydroxy-5-sec-nonylbenzoic hydrazide hydrochloride
2-hydroxy-5-(1-ethyl-1-methylpentyl)benzoic hydrazide hydrochloride
2-hydroxy-5-t-octylbenzoic hydrazide hydrochloride
2-hydroxy-3-t-amylbenzoic hydrazide phosphate
2-hydroxy-3-sec-butylbenzoic hydrazide phosphate
2-hydroxy-3-(1,1,5-trimethylhexyl)benzoic hydrazide phosphate
2-hydroxy-3,5-di-isopropylbenzoic hydrazide sulphate
2-hydroxy-3,5-di-sec-butylbenzoic hydrazide sulphate
2-hydroxy-3,5-di-t-amylbenzoic hydrazide sulphate
2-hydroxy-3,5-di-t-octylbenzoic hydrazide sulphate
2-hydroxy-5-methyl-3-(1,1,5-trimethylhexyl)benzoic hydrazide sulphate
2-hydroxy-5-sec-butyl-3-(1,1,5-trimethylhexyl)benzoic hydrazide hydrochloride
2-hydroxy-5-t-amyl-3-(1,1,5-trimethylhexyl)benzoic hydrazide hydrochloride
2-hydroxy-5-sec-butyl-3-decylbenzoic hydrazide hydrochloride
2-hydroxy-5-sec-butyl-3-(1,1,3-trimethylpentyl)benzoic hydrazide hydrochloride
2-hydroxy-3-sec-butyl-5-(1,1,5-trimethylhexyl)benzoic hydrazide phosphate
2-hydroxy-3-t-amyl-5-(1,1,5-trimethylhexyl)benzoic hydrazide phosphate
2-hydroxy-3,5,6-tri-isopropylbenzoic hydrazide sulphate Where $R_1$, $R_2$, $R_3$ or $R_4$ are cycloalkyl, singly or in combination
2-hydroxy-5-cyclopentylbenzoic hydrazide sulphate
2-hydroxy-5-cyclohexylbenzoic hydrazide sulphate
2-hydroxy-5-dimethylcyclohexylbenzoic hydrazide hydrochloride
2-hydroxy-5-cyclododecylbenzoic hydrazide hydrochloride
2-hydroxy-3-cyclohexylbenzoic hydrazide phosphate
2-hydroxy-3,5-dicyclohexylbenzoic hydrazide sulphate Where $R_1$, $R_2$, $R_3$ and $R_4$ are aralkyl, singly or in combination
2-hydroxy-5-benzylbenzoic hydrazide sulphate
2-hydroxy-5-($\alpha\alpha$-dimethylbenzyl)benzoic hydrazide sulphate
2-hydroxy-3,5-di($\alpha\alpha$-dimethylbenzyl)benzoic hydrazide sulphate
2-hydroxy-5-(3-hydrazido-4-hydroxybenzyl)benzoic hydrazide hydrochloride
2-hydroxy-3-t-butyl-5-(3-hydrazido-4-hydroxy-5-t-butylbenzyl)benzoic hydrazide phosphate Where $R_1$, $R_2$, $R_3$ or $R_4$ are alkenyl, singly or in combination
2-hydroxy-3-allylbenzoic hydrazide sulphate
2-hydroxy-3-hex-5-enylbenzoic hydrazide sulphate
2-hydroxy-3-dodec-11-enylbenzoic hydrazide sulphate
2-hydroxy-5-hex-5-enylbenzoic hydrazide hydrochloride
2-hydroxy-5-dodec-11-enylbenzoic hydrazide phosphate
2-hydroxy-3,5-dihexe5-enylbenzoic hydrazide sulphate Where $R^1$, $R^2$, $R^3$, $R^4$ are $-OR^7$ where $R^7$ is alkyl, alkenyl, cycloalkyl, aralkyl, alkaryl, or aryl, singly or in combination
2-hydroxy-3-methoxybenzoic hydrazide sulphate
2-hydroxy-5-methoxybenzoic hydrazide sulphate
2-hydroxy-4-n-hexoxybenzoic hydrazide sulphate
2-hydroxy-5-n-dodecoxybenzoic hydrazide sulphate
2-hydroxy-5-n-octadecoxybenzoic hydrazide sulphate
2-hydroxy-5-cyclohexyloxybenzoic hydrazide hydrochloride
2-hydroxy-4-dodecenyloxybenzoic hydrazide hydrochloride
2-hydroxy-4-phenoxybenzoic hydrazide hydrochloride
2-hydroxy-4-benzyloxybenzoic hydrazide hydrochloride 2-hydroxy-3,5-di-n-amyloxybenzoic hydrazide phosphate 2-hydroxy-5-(4-isopropylphenoxy)benzoic hydrazide phosphate Where R¹, R², R³, R⁴ are alkaryl singly or in combination 2-hydroxy-5-(4-isopropylphenyl)benzoic hydrazide sulphate 2-hydroxy-5-(3,4-xylyl)benzoic hydrazide hydrochloride Where R₁, R₂, R₃ or R₄ are aryl, singly or in combination 2-hydroxy-5-phenyl benzoic hydrazide sulphate Where R¹, R², R³, R⁴ are alkyl, alkaryl, aryl, alkenyl, cycloalkyl, aralkyl or a group -OR⁷ where R⁷ is an alkyl, cycloalkyl, aryl, alkaryl, aralkyl or alkenyl group 2-hydroxy-3-t-amyl-5-methoxybenzoic hydrazide sulphate 2-hydroxy-3-iso-propyl-5-phenylbenzoic hydrazide sulphate 2-hydroxy-3-sec-amyl-5-(αα-dimethylbenzyl)benzoic hydrazide sulphate 2-hydroxy-3-t-butyl-5-(3,4-xylyl)benzoic hydrazide sulphate 2-hydroxy-3-sec-butyl-5-cyclohexylbenzoic hydrazide sulphate 2-hydroxy-3-methoxy-5-phenylbenzoic hydrazide sulphate 2-hydroxy-3-cyclohexyloxy-5-(αα-dimethylbenzyl)-benzoic hydrazide sulphate 2-hydroxy-3-n-hexoxy-5-cyclopentylbenzoic hydrazide hydrochloride 2-hydroxy-3-phenyl-5-cyclohexylbenzoic hydrazide hydrochloride 2-hydroxy-3-phenyl-5-(αα-dimethylbenzyl)benzoic hydrazide hydrochloride 2-hydroxy-3-cyclopentyl-5-(αα-dimethylbenzyl)benzoic hydrazide hydrochloride 2-hydroxy-3-dodec-11-enyl-5-cyclopentylbenzoic hydrazide hydrochloride 2-hydroxy-3-allyl-5-(αα-dimethylbenzyl)benzoic hydrazide phosphate 2-hydroxy-3-allyl-5-methoxybenzoic hydrazide phosphate 2-hydroxy-3-dodec-11-enyl-5-phenylbenzoic hydrazide phosphate 2-hydroxy-3-dodec-11-enyl-5-t-butylbenzoic hydrazide phosphate 2-hydroxy-3-sec-butyl-5-phenyl benzoic hydrazide sulphate 2-hydroxy-3-methyl-5-(α,α-dimethylbenzyl) benzoic hydrazide sulphate Where R₁ and R₂ or R₂ and R₃ or R₃ and R₄ form part of an aromatic ring system (which may be substituted by one or more alkyl groups)

1-hydroxy-2-napthoichydrazide sulphate 3-hydroxy-2-naphthoichydrazide hydrochloride 2-hydroxy-1-naphthoichydrazide phosphate.

The free hydrazide may be prepared by methods well known in the art, for example, by the reaction of hydrazine hydrate with an ester, such as a lower alkyl ester, preferably the methyl ester, of the appropriate salicylic acid according to the equation:

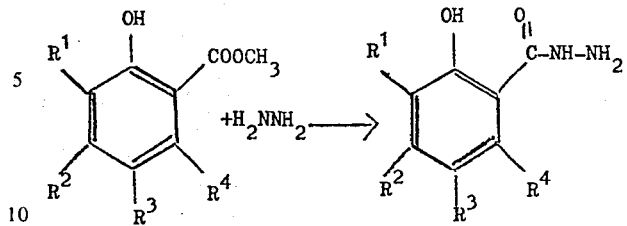

The reaction may be carried out by refluxing the reactants in a solvent, such as aqueous ethanol.

The substituted salicyclic acids may be prepared by conventional synthetic routes. One such route is by the Friedel-Crafts alkylation of salicylic acid or methyl salicylate (or their monoalkyl derivatives) to give mono- or di-alkyl derivatives. α-Olefins are of special value as alkylating agents. Alkylation of a mono-alkyl salicylic acid or methyl salicylate with a different alkylating agent can give mixed alkyl derivatives. This synthetic route favours substitution in the R¹ and R³ positions but re-arrangements, which are not uncommon under the conditions of the Friedel-Crafts synthesis can give substitution in the R² and/or R⁴ positions.

A second route is by carboxylation of mono- or poly-substituted phenols which have a vacant position ortho to the hydroxyl group (Kolbe synthesis). The more readily available phenols are usually substituted in the ortho and/or para positions and this route consequently may be used to provide a hydrazide substituted in the R¹ and/or R³ positions. However, derivatives prepared from m-substituted phenols give compounds which are substituted in the R² and/or R⁴ positions. Generally, however, compounds substituted in the R¹ and R³ positions are preferred because of ease of synthesis and/or availability of starting materials.

A third route is by the carboxylation of the mono-ether of a dihydric phenol or by the mono-etherification of a dihydroxy benzoic acid of the formula II

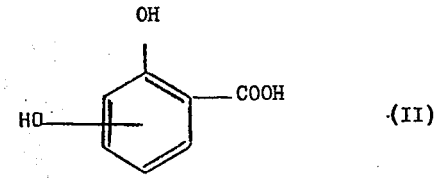

to provide a salicylic acid substituted by an OR⁷ group.

A fourth route is by thermal rearrangement of an alkenyl aryl ether to give an o-substituted phenol, followed by carboxylation to give the corresponding alkenyl substituted salicylic acid.

A fifth route is by thermal rearrangement of an alkenyl ether of salicylic acid or its ester to give the corresponding alkenyl substituted salicylic acid or its ester.

The substituted salicylic acids, prepared by the above routes, may be allowed to react with e.g. formaldehyde or acetone to provide compounds having two substituted salicylic acid moieties joined by a

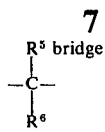

wherein $R^5$ and $R^6$ are each a hydrogen atom or a methyl group.

The present invention also provides a process for preparation of compounds of formula I by reacting the corresponding hydrazide with an appropriate acid $H_nX$ such as sulphuric acid, when X and n are as previously defined. The hydrazide may be dissolved in a solvent, preferably a hydrocarbon, an ether or chlorinated hydrocarbon and is then reacted with, e.g. sulphuric acid to form the salt which is itself soluble in the solvent. Suitable solvents are, e.g. kerosene, diethyl ether and carbon tetrachloride. The hydrochlorides may be prepared by passing hydrogen chloride gas through a solution of the hydrazide in a suitable solvent. The salt is recovered by evaporation of the solvent layer.

The present invention also provides a process for extracting a metal from an aqueous acid or alkaline solution which comprises treating the solution with a compound of formula I defined above, and then extracting the metal chelate thus produced into an organic solvent.

Examples of metals which can be extracted from aqueous solutions according to the present invention are copper, cobalt, nickel, zinc, chromium, cadmium, tin, silver, gold, mercury and Vanadium.

When an aqueous acid solution of a metal is treated with a hydrazide salt of general formula I in an organic solvent a metal chelate is formed which though insoluble in aqueous media can be extracted into the organic phase.

Suitable organic solvents include chlorinated hydrocarbons, such as chloroform, perchloroethylene, trichloroethylene and trichloroethane; water immiscible alcohols, such as isodecanol, capryl alcohol and tridecanol, hydrocarbons and ethers (or combinations of these solvents). It is preferred that the organic phase is a hydrocarbon solvent, e.g. kerosene.

One particularly important extraction from acid solutions is that of copper, which is often present together with iron. In this case it is important to use an extractant which selectively extracts the copper and leaves the iron in the aqueous solution. We have found that the hydrazide salts of the present invention are particularly effective in this selective extraction process.

When metals are extracted from alkaline solutions according to the present invention, it is preferred that the metal is present in an ammoniacal solution. In this case the metal may be, for example, copper, cobalt, nickel or zinc.

We believe that when the hydrazide salts of the present invention are used to extract metals from alkaline solutions, they are slowly converted to the free hydrazide. Therefore when extracting metals from alkaline solutions the free hydrazide may be used instead of the salt if desired. This represents a further feature of the present invention.

We have also found that the effectiveness of the process is enhanced if the complexing agent and solvent are used in admixture with a phosphate, phosphite, phosphonate, phosphinate, phosphine oxide, sulphone, sulphoxide, or a carbonyl compound, especially a ketone.

Suitable phosphates are tri-hydrocarbyl phosphates, such as trialkyl phosphates and triaryl phosphates. Examples of such phosphates are tributyl phosphate, triphenyl phosphate, diphenyl n-hexyl phosphate and tritolyl phosphate.

Suitable phosphates are di-hydrocarbyl phosphites, such as dibutyl phosphate and diphenyl phosphite.

Suitable phosphonates are the di-hydrocarbyl, hydrocarbyl phosphonates, such as dibutyl methylphosphonate and diphenyl n-octylphosphonate.

Suitable phosphinates are the hydrocarbyl di-hydrocarbyl phosphinates, such as n-butyl di-n-hexylphosphinate.

Suitable phosphine oxides are the tri-hydrocarbyl phosphine oxides, such as tri-n-butyl phosphine oxide and tri-phenyl phosphine oxide.

Among these various phosphorus compounds the preferred ones are the phosphates and phosphonates, especially the phosphates, and the most preferred are the trialkyl phosphates.

Suitable sulphones are the di-hydrocarbyl sulphones, such as dimethyl sulphone, di-n-butyl sulphone and butadiene sulphone.

Suitable sulphoxides are the di-hydrocarbyl sulphoxides, such as dimethyl sulphoxide and di-butyl sulphoxide.

The most preferred class of compounds which we add to the solvent is the ketones.

Although we have found that any ketone enhances the extraction efficiency of the hydrazide salt in the solvent it is preferred to use a ketone having low solubility in water, so that after removal of the metal from the organic phase, the solvent mixture can be recycled without losing much ketone into the aqueous phase.

The ketone may be a fully aromatic ketone, an aliphatic-aromatic ketone or a fully aliphatic ketone, a fully aliphatic ketone being preferred. Suitable ketones include, for example, benzophenone, acetophenone, methyl n-propyl ketone, methyl n-butyl ketone, methyl iso-butyl ketone, methyl n-amyl ketone, methyl isoamyl ketone, di-n-propyl ketone, ethyl iso-butyl ketone, 5-methylheptan-3-one, methyl n-hexyl ketone, di-isobutyl ketone, 2,6,8-trimethylnonan-4-one, mesityl oxide, iso-phorone, cyclohexanone, methyl cyclohexanone, and 1-tetralone.

The amount of ketone used is not particularly critical and amounts of from 0.5 to 10 moles per mole of hydrazide salt may be used. The preferred amounts are from 1 to 4 moles, most preferably 2 moles, per mole of hydrazide salt.

The ketone may be simply added to the solvent, or when the preferred solvent kerosene is employed some ketone may be formed from the kerosene by oxidation. This may be carried out by heating the kerosene and blowing air through it or the ketonic compounds may be formed during distillation of kerosene in the presence of air.

The kerosene/ketone solvent mixture may optionally contain a water immiscible alcohol, such as those mentioned above.

The metal values can be recovered from the organic phase by contact with an acid such as sulphuric acid whereupon the metal values are removed into the aqueous phase. Consequently, they may be obtained in a more concentrated form than in the original aqueous solution and are free from undesired products, e.g. copper is free of iron. The metal may then be recovered from the aqueous phase by electrolysis. Alternatively, the metal may be recovered from the organic phase by hydrogenation.

The invention will be illustrated by reference to the following examples.

EXAMPLE 1

2-Hydroxy-3,5-di-tert-amylbenzoic hydrazide sulphate 2,4-di-t-amyl phenol (0.44 m) and KOH (0.5 m) were refluxed in toluene for two hours. Dimethylformamide (100 ml) was added and solvent was removed by distillation until the temperature reached 145°. $CO_2$ was bubbled in and more solvent was removed until the temperature reached 160°. This temperature was maintained for four hours with $CO_2$ passing in and the reaction mixture was worked up to give 2-hydroxy-3,5-di-t-amylbenzoic acid which was esterified to form the methyl ester, which had a boiling point of 127°–129°C at 0.7 mm Hg pressure, in 50% yield. The ester was then converted to the hydrazide by refluxing with hydrazine hydrate in aqueous ethanol. The hydrazide had a melting point of 132°–133°C and the following elemental analysis by weight:

|  | FOUND | CALCULATED FOR $C_{17}H_{28}N_2O_2$ |
|---|---|---|
| Carbon | 70.05% | 69.86% |
| Hydrogen | 9.78% | 9.59% |
| Nitrogen | 9.32% | 9.59% |

The hydrazide (5.0 g) was dissolved in kerosene (20 ml) and the resulting solution shaken with sulphuric acid (100 ml, 2N) for 12 hours at room temperature.

The organic phase was separated, evaporated to dryness, to give 2-hydroxy-3,5-di-t-aryl benzoic hydrazide sulphate, in quantitative yield.

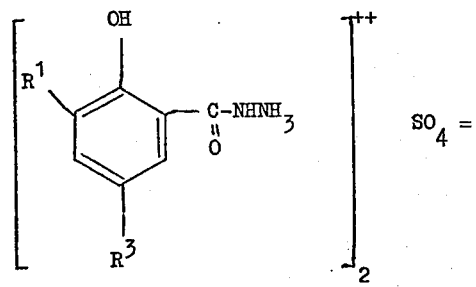

where $R^1 = R^3 =$ t-amyl

The sulphate has a melting point of 238°–243°C and a strong IR absorption peak at 1100 cm$^{-1}$ indicating sulphate.

EXAMPLE 2

2-Hydroxy-3-t-amyl benzoic hydrazide hydrochloride

Example 1 was repeated, except that the 2,4-di-t-amyl phenol was replaced by 2-t-amyl phenol; 2-hydroxy-3-t-amylbenzoic hydrazide having a melting point of 156°–157°C and the following elemental analysis by weight, was obtained:

|  | FOUND | CALCULATED FOR $C_{12}H_{18}N_2O_2$ |
|---|---|---|
| Carbon | 65.01% | 64.86% |
| Hydrogen | 8.12% | 8.10% |
| Nitrogen | 12.39% | 12.61% |

The hydrazide in solvent ether was converted into its hydrochloride by passing dry HCl gas through the solution. The solvent was removed and the hydrochloride which was obtained in quantitative yield had a melting point of 230°–236°C with decomposition and the following elemental analysis by weight:

|  | FOUND | CALCULATED FOR $C_{12}H_{19}N_2O_2Cl$ |
|---|---|---|
| Carbon | 55.44% | 55.70% |
| Hydrogen | 7.54% | 7.40% |
| Nitrogen | 10.57% | 10.83% |
| Chlorine | 14.06% | 13.70% |

EXAMPLE 3

2-Hydroxy-3,5-di-tert-butyl benzoic hydrazide sulphate

Concentrated sulphuric acid (70 ml) was added over a period of 1.5 hours to a stirred mixture of methyl salicylate (30.4 g, 0.2 m), methanol (16.0 g, 0.2 m) and tert-butanol (37.0 g, 0.5 m), and the temperature of the mixture was maintained at 0°–5°C. After stirring for a further 6 hours at room temperature the mixture was poured into water. The white precipitate was filtered off, washed with water and then dried giving 52 g of product melting 70°C on crystallisation from methanol. This was converted into its hydrazide by refluxing with hydrazine hydrate in aqueous ethanol. The resulting hydrazide had a melting point of 200°–202°C on crystallisation from petroleum ether (boiling range 60°–80°C) and had the following elemental analysis by weight:

|  | FOUND | CALCULATED FOR $C_{15}H_{24}N_2O_2$ |
|---|---|---|
| Carbon | 68.21% | 68.18% |
| Hydrogen | 8.86% | 9.09% |
| Nitrogen | 10.41% | 10.60% |

The hydrazide was converted into its sulphate (m.p. > 200°C, decomposed) by the procedure described in Example 1.

EXAMPLE 4

2-Hydroxy-3,5-di-sec-butylbenzoic hydrazide hydrochloride

Example 3 was repeated, except that the tert-butanol was replaced by sec-butanol; 2-hydroxy-3,5-di-sec-butyl benzoic hydrazide, having a melting point of 82°–83°C and the following elemental analysis by weight, was obtained:

|  | FOUND | CALCULATED FOR $C_{15}H_{24}N_2O_2$ |
|---|---|---|
| Carbon | 68.19% | 68.18% |
| Hydrogen | 9.37% | 9.09% |
| Nitrogen | 10.58% | 10.60% |

The hydrazide was converted into its hydrochloride by means of dry HCl gas according to the procedure described in Example 2. The hydrochloride had a melting point of 196°–203°C with decomposition and the following elemental analysis by weight:

|  | FOUND | CALCULATED FOR $C_{15}H_{25}H_2O_2Cl$ |
|---|---|---|
| Carbon | 60.13% | 59.88% |
| Hydrogen | 8.22% | 8.38% |
| Nitrogen | 9.21% | 9.31% |
| Chlorine | 11.80% | 11.79% |

EXAMPLE 5

Preparation of mixed 2-hydroxy-5-sec-butyl-3-(1,1,5-trimethylhexyl)- and 2-hydroxy-3-sec-butyl-5-(1,1,5-trimethylhexyl)benzoic hydrazide sulphates Alkylation of methyl salicylate (304 g, 2 m) with sec-butanol (148 g, 2 m) in methanol 200 ml) using concentrated sulphuric acid (450 ml) as the catalyst at room temperature gave a mixture of methyl 2-hydroxy-3-sec-butyl- and methyl 2-hydroxy-5-sec-butyl benzoate (boiling point 7 mm Hg 120°–128°C, 50%). N.M.R. analysis indicated the mixture to be in the ratio of 3:2 respectively.

This mixture (41.6 g, 0.2 m) alkylated with 2,6-dimethylheptan-4-ol (28.8 g, 0.2 m) in methanol (30 ml) using sulphuric acid (90 ml) as catalyst at room temperature to give a mixture of methyl 2-hydroxy-5-sec-butyl-3-(1,1,5-trimethylhexyl)- and methyl 2-hydroxy-3-sec-butyl-5-(1,1,5-trimethylhexyl)benzoate (boiling point 0.25 mm Hg 136°–140°C, 70% 1:1 ratio by N.M.R.).

This mixture was converted to the hydrazide by refluxing with hydrazine hydrate in ethanol.

The resulting hydrazide had the following elemental analysis by weight:

|  | FOUND | CALCULATED FOR $C_{20}H_{34}N_2O_2$ |
|---|---|---|
| Carbon | 72.0% | 71.85% |
| Hydrogen | 10.14% | 10.18% |
| Nitrogen | 8.11% | 8.38% |

THe hydrazide was converted to its sulphate by shaking a solution in petroleum ether (boiling range 60°–80°C) with sulphuric acid (150 g/1). The resulting sulphate had a melting point of 152°–156°C (decomposed) and a strong I.R. absorption peak at 1100 cm$^{-1}$ indicating sulphate. It also had the following elemental analysis by weight:

|  | FOUND | CALCULATED FOR $C_{40}H_{70}N_4O_8S$ |
|---|---|---|
| Carbon | 62.48% | 62.66% |
| Hydrogen | 9.18% | 9.14% |
| Sulphur | 4.06% | 4.18% |

EXAMPLE 6

2-Hydroxy-5-(1,1,5-trimethylhexyl)benzoic hydrazide sulphate

Methyl salicylate (15.2 g, 0.1 m) was alkylated with 14.4 g (0.1 m) of 2,6-dimethylheptan-4-ol in 10 ml methanol using 35 ml concentrated sulphuric acid as catalyst, at room temperature, to give methyl 2-hydroxy-5-(1,1,5-trimethylhexyl)benzoate (b.p. 180°–190°C 7 mm Hg pressure) in 60% yield. This was converted quantitatively into its hydrazide by refluxing with hydrazine hydrate in aqueous ethanol. The resulting hydrazide had a melting point of 121°–122°C, and the following elemental analysis by weight:

|  | FOUND | CALCULATED FOR $C_{16}H_{22}N_2O_2$ |
|---|---|---|
| Carbon | 69.14% | 69.06% |
| Hydrogen | 9.36% | 9.35% |
| Nitrogen | 10.37% | 10.07% |

Following the procedure described in Example 1 the hydrazide sulphate (melting point 200°C with decomposition) was produced.

EXAMPLE 7

2-Hydroxy-3,5-diisopropylbenzoic hydrazide sulphate

Salicylic acid (0.67 m) was alkylated with 1.33 m isopropanol using 3.3 m concentrated sulphuric acid as catalyst at 70°C for six hours, to give 2-hydroxy-3,5-diisopropyl benzoic acid (m.p. 113°–116°C) in 40% yield. This was esterified to form the methyl ester and converted into its hydrazide using hydrate in aqueous ethanol. The hydrazide had a melting point of 111°–113°C and the following elemental analysis by weight:

|  | FOUND | CALCULATED FOR $C_{13}H_{20}N_2O_2$ |
|---|---|---|
| Carbon | 66.19% | 66.10% |
| Hydrogen | 8.6% | 8.47% |
| Nitrogen | 12.01% | 11.86% |

Following the procedure described in Example 1 the hydrazide sulphate (melting point 200°C with decomposition) was produced.

EXAMPLE 8

2-Hydroxy-5-($\alpha\alpha$-dimethylbenzyl)benzoic hydrazide sulphate

Methyl salicylate (1 m) was alkylated with $\alpha$-methyl styrene (1 m) using the procedure set out in Example 4. The reaction gave methyl 2-hydroxy-5-($\alpha\alpha$-dimethylbenzyl)benzoate having a boiling point of 200°–222°C at 7 mm Hg pressure, which was converted to its hydrazide by refluxing with hydrazine hydrate in aqueous ethanol. The hydrazide had a melting point of 169°–171°C and the following elemental analysis by weight:

|  | FOUND | CALCULATED FOR $C_{16}H_{18}N_2O_2$ |
|---|---|---|
| Carbon | 70.97% | 71.11% |
| Hydrogen | 6.83% | 6.67% |
| Nitrogen | 10.13% | 10.37% |

Following the procedure described in Example 1 the hydrazide sulphate (melting point 200°C with decomposition) was produced.

EXAMPLE 9

2-Hydroxy-5-dimethylcyclohexyl benzoic hydrazide sulphates

Methyl salicylate was alkylated with a mixture of dimethylcyclohexanol isomers according to the procedure described in Example 4 and gave methyl 2- hydroxy-5-dimethylcyclohexyl benzoate having a boiling point of 180°–196°C at 7 mm Hg pressure. This benzoate was converted to its hydrazide by refluxing with hydrazine hydrate in aqueous ethanol. The hydrazide mixture had a melting point of 113°–115°C and the following elemental analysis by weight:

|  | FOUND | CALCULATED FOR $C_{15}H_{22}N_2O_2$ |
|---|---|---|
| Carbon | 68.55% | 68.70% |
| Hydrogen | 8.63% | 8.40% |
| Nitrogen | 10.61% | 10.69% |

Following the procedure described in Example 1 the hydrazide sulphate (melting point 200°C with decomposition) was produced.

EXAMPLE 10

2-Hydroxy-3-allyl benzoic hydrazide hydrochloride

Methyl salicylate (15.2 g, 0.1 m), allyl bromide (12.1 g, 0.1 m), potassium carbonate (14.0 g, 0.1 m) and methyl ethyl ketone (70.0 g) were heated under reflux for four hours. The reaction mixture was poured into water (200 ml) and shaken with petroleum ether (boiling range 60°–80°C). The petroleum extract was washed with water and dried over anhydrous magnesium sulphate. Removal of the drying agent and solvent gave the allyl ether of methyl salicylate (14.3 g), which was heated with stirring to 230°C and maintained at this temperature for three hours. Distillation under reduced pressure gave the methyl ester of 2-hydroxy-3-allyl benzoic acid (7.7 g), which has a boiling point of 132°–136°C at 10 mm Hg pressure. The ester was then converted to the hydrazide by refluxing with hydrazine hydrate (7.5 ml), water (7.5 ml) and ethanol (30 ml) for 12 hours. The hydrazide was crystallised from ethanol to give a white solid (3.8 g) melting point 154°–155°C having the following elemental analysis by weight:

|  | FOUND | CALCULATED FOR $C_{10}H_{12}N_2O_2$ |
|---|---|---|
| Carbon | 62.68% | 62.48% |
| Hydrogen | 6.30% | 6.30% |
| Nitrogen | 14.56% | 14.56% |

The above hydrazide, in ether solvent, was converted to its hydrochloride using dry HCl gas according to the procedure described in Example 2. It gave 2-hydroxy-3-allyl benzoic hydrazide hydrochloride, melting point 201°–206°C (with decomposition), which has the following elemental analysis by weight:

|  | FOUND | CALCULATED FOR $C_{10}H_{13}N_2O_2Cl$ |
|---|---|---|
| Carbon | 52.44% | 52.52% |
| Hydrogen | 5.78% | 5.73% |
| Nitrogen | 12.00% | 12.25% |
| Chlorine | 15.86% | 15.51% |

EXAMPLE 11

2-Hydroxy-3-dodecenyl benzoic hydrazide hydrochloride

Methyl salicylate (60.8 g, 0.4 m), dodecenyl chloride (81.0 g 0.4 m), potassium carbonate (52.0 g, 0.4 m) and methyl ethyl ketone (200 g) were heated under reflux for 48 hours. The reaction mixture was poured into water (800 ml) and shaken with ether. The ethereal extract was washed with water and was dried over anhydrous magnesium sulphate. Removal of the drying agent and solvent gave the dodecenyl ether of methyl salicylate (103.7 g) which was heated at 150°–200°C for 5 hours. Distillation under reduced pressure gave the methyl ester of 2-hydroxy-3-dodecenyl benzoic acid which has a boiling range of 158°–172°C at 0.2 mm Hg pressure. The ester (4.7 g) was converted to the hydrazide by refluxing with hydrazine hydrate (5.0 ml), water (5.0 ml) and ethanol (50.0 ml) for 12 hours. The reaction mixture was poured into water, shaken with ether, and the ethereal extract was dried over magnesium sulphate. Removal of the solvent gave the solid hydrazide which was crystallised from petroleum ether (boiling range 60°–80°C). 2-Hydroxy-3-dodecenyl benzoic hydrazide had a melting point of 110°–112°C and the following elemental analysis by weight:

|  | FOUND | CALCULATED FOR $C_{19}H_{30}N_2O_2$ |
|---|---|---|
| Carbon | 71.4% | 71.7% |
| Hydrogen | 9.3% | 9.4% |
| Nitrogen | 8.5% | 8.8% |

The above hydrazide, in methanol, was converted to its hydrochloride using dry HCl gas according to the procedure described in Example 2. It gave 2-hydroxy-3-dodecenyl benzoic hydrazide hydrochloride, melting point 243°–247°C with decomposition which had the following elemental analysis by weight:

|  | FOUND | CALCULATED FOR $C_{19}H_{31}N_2O_2Cl$ |
|---|---|---|
| Carbon | 64.47% | 64.29% |
| Hydrogen | 8.59% | 8.80% |
| Nitrogen | 7.66% | 7.89% |
| Chlorine | 10.41% | 9.99% |

EXAMPLE 12

2-Hydroxy-5-isopropoxy benzoic hydrazide hydrochloride

Methyl 2,5-dihydroxy benzoate, melting point 85°–87°C, was obtained in 83% yield by esterification of 2,5-dihydroxy benzoic acid with methanol in the presence of sulphuric acid catalyst.

Methyl 2,5-dihydroxy benzoate (16.8 g, 0.1 m), methanol (100 ml), sodium methoxide (5.4 g, 0.1 m) and 2-bromopropane (12.3 g, 0.1 m) were mixed and heated under reflux for 18 hours. An additional amount of 2-bromopropane (5 g) was added and the heating continued for a further 12 hours. The reaction mixture was poured into water and shaken with ether. The ethereal extract was washed with water, dried over magnesium sulphate and the solvent removed to yield crude methyl 2-hydroxy-5-isopropoxy benzoate (16.7 g). Distillation under reduced pressure gave the pure product (4.0 g) boiling range 156°–162°C at 11 mm Hg pressure. The ester (4.0 g) was converted to the hydrazide by refluxing with hydrazine hydrate (4.0 ml), water (4.0 ml) and ethanol (50.0 ml) for 12 hours. The reaction mixture was poured into water, shaken with ether, and the ethereal extract was dried over magnesium sulphate. Removal of the solvent gave the solid hydrazide (3.7 g) which was crystallised from a chloroform petroleum ether solvent. 2-Hydroxy-5-isopropoxy benzoic hydrazide had a melting point at 123°–125°C and the following elemental analysis by weight:

|  | FOUND | CALCULATED FOR $C_{10}H_{14}N_2O_3$ |
|---|---|---|
| Carbon | 56.97% | 57.13% |
| Hydrogen | 6.92% | 6.71% |
| Nitrogen | 13.17% | 13.33% |

The above hydrazide in ether was converted to its hydrochloride using dry HCl gas, according to the procedure described in Example 2. It gave 2-hydroxy-5-isopropoxybenzoic hydrazide hydrochloride, melting point 198°–202°C with decomposition which had the following elemental analysis by weight:

|  | FOUND | CALCULATED FOR $C_{10}H_{15}N_2O_3Cl$ |
|---|---|---|
| Carbon | 48.86% | 48.68% |
| Hydrogen | 6.33% | 6.13% |
| Nitrogen | 11.31% | 11.36% |
| Chlorine | 14.56% | 14.37% |

EXAMPLE 13

2-Hydroxy-5-n-dodecoxy benzoic hydrazide hydrochloride

Methyl 2,5-dihydroxy benzoate (16.8 g, 0.1 m) was added to a solution of sodium metal (2.3 g, 0.1 m) in absolute ethanol (30 ml). A further 60 ml. of alcohol were added and 1-bromododecane (24.9 g, 0.1 m) was run slowly into this mixture. The reaction mixture was refluxed for 18 hours, poured into water and shaken with ether. The ethereal extracts were washed with water, dried over MgSO4, and the solvent was removed to give crude ethyl-2-hydroxy-5-n-dodecoxy benzoate (29.4 g). Distillation under reduced pressure gave the pure product (8 g) which had boiling range 205°–210°C at 0.8 mm Hg pressure. This ester (5.8 g) was converted to the hydrazide by refluxing with hydrazine hydrate (6.0 ml), water (6.0 ml), and ethanol (50 ml) for 12 hours. The reaction mixture was poured into water, shaken with ether and the ethereal extract was dried over magnesium sulphate. Removal of the solvent gave the solid hydrazide (3.4 g) which was crystallised from methanol. 2-Hydroxy-5-n-dodecoxy benzoic hydrazide has a melting point at 120°C and the following elemental analysis by weight:

|  | FOUND | CALCULATED FOR $C_{19}H_{32}N_2O_3$ |
|---|---|---|
| Carbon | 68.11% | 67.82% |
| Hydrogen | 9.57% | 9.59% |
| Nitrogen | 8.13% | 8.33% |

The above hydrazide in ether was converted to its hydrochloride using dry HCl gas, according to the procedure described in Example 2. It gave 2-hydroxy-5-dodecoxybenzoic hydrazide hydrochloride, melting point 254°–256°C with decomposition which had the following elemental analysis by weight:

|  | FOUND | CALCULATED FOR $C_{19}H_{33}N_2O_3Cl$ |
|---|---|---|
| Carbon | 60.99% | 61.19% |
| Hydrogen | 8.82% | 8.92% |
| Nitrogen | 7.38% | 7.51% |
| Chlorine | 9.72% | 9.51% |

EXAMPLE 14

2-Hydroxy-4-n-octadecoxy benzoic hydrazide hydrochloride

Methyl-2,5-dihydroxy benzoate 16.8 g. (0.1 m.) was added to sodium methoxide (5.9 g. 0.11 m.) in methanol (100 ml.). 1-Octadecyl bromide (33.4 g., 0.1 m.) was added slowly, and the reaction mixture refluxed for 18 hours. The mixture was poured into water and shaken with ether. The ethereal extracts were washed with water, dried with magnesium sulphate, and the solvent was removed to give crude methyl 2-hydroxy-5-octadecoxy benzoate (41 g.). Distillation under reduced pressure gave the pure ester (10 g.) which had a boiling point of 232°–242°C at 0.07 mm. Hg. pressure, and a melting point of 62°–63.5°C after crystallisation from ethanol. This ester was converted to the hydrazide by refluxing with hydrazine hydrate (10.0 ml.), water (10.0 ml.) and ethanol (50 ml.) for 12 hours. This reaction mixture was poured into water, shaken with ether and the ethereal extracts were washed with water and dried over magnesium sulphate. Removal of the solvent gave the solid hydrazide (8 g.) which was crystallised from aqueous dimethyl formamide. 2-Hydroxy-5-n-octadecoxy benzoic hydrazide had a melting point of 125°–127°C and the following elemental analysis by weight:

|  | Found | Calculated for $C_{25}H_{44}N_2O_3$ |
|---|---|---|
| Carbon | 71.34% | 71.43% |
| Hydrogen | 10.42% | 10.47% |
| Nitrogen | 6.40% | 6.67% |

The above hydrazide in petroleum ether (boiling point 100°–120°C) was converted to its hydrochloride using dry HCl gas, according to the procedure described in Example 2. It gave 2-hydroxy-5-n-octadecoxybenzoic hydrazide hydrochloride melting point 200°C with decomposition which had the following elemental analysis by weight:

|  | Found | Calculated for $C_{25}H_{45}N_2O_3Cl$ |
|---|---|---|
| Carbon | 65.52% | 65.69% |
| Hydrogen | 9.86% | 9.92% |
| Nitrogen | 6.09% | 6.13% |
| Chlorine | 7.95% | 7.76% |

EXAMPLE 15

2-Hydroxy-4-n-hexoxy benzoic hydrazide hydrochloride

Methyl-2,4-dihydroxy benzoate, melting point 120°–121°C was obtained in 80% yield by esterification of 2,4-dihydroxy benzoic acid with methanol in presence of sulphuric acid catalyst.

Methyl-2,4-dihydroxy benzoate (16.8 g., 0.1 m.), sodium methoxide (6.0 g.),1-bromohexane (18.5 g.) and methanol (100 ml.) were refluxed for 18 hours. The reaction mixture was poured into water, shaken with ether, and the etheral extracts were washed with water and dried over magnesium sulphate. The solvent was removed to give crude methyl-2-hydroxy-4-n-hexoxy benzoate (22 g.). Distillation under reduced pressure gave pure methyl-2-hydroxy-4-n-hexoxy benzoate (8.8 g.) which has a boiling point of 118°–126°C at 0.025 mm. Hg. pressure. This ester (5.0 g.) was refluxed with hydrazine hydrate (5.0 ml.), water (5.0 ml.) and ethanol (50 ml.) for 12 hours. The mixture was poured into water and the solid which separated was filtered off, dried and crystallised from chloroform/petroleum ether (60°–80°C). The pure hydrazide (3.0 g.) had a melting point of 150-151°C and the following elemental analysis by weight:

|  | Found | Calculated for $C_{13}H_{20}N_2O_3$ |
|---|---|---|
| Carbon | 61.77% | 61.88% |
| Hydrogen | 8.20% | 8.0% |
| Nitrogen | 11.08% | 11.10% |

The above hydrazide in methanol was converted to its hydrochloride using dry HCl gas, according to the procedure described in Example 2. It gave 2-hydroxy-4-n-hexoxybenzoic hydrazide hydrochloride, melting point 249°–251°C with decomposition which had the following elemental analysis by weight:

|  | Found | Calculated for $C_{13}H_{21}N_2O_3Cl$ |
|---|---|---|
| Carbon | 54.08% | 54.07% |
| Hydrogen | 7.32% | 7.33% |
| Nitrogen | 9.55% | 9.70% |
| Chlorine | 12.21% | 12.28% |

EXAMPLE 16

2-Hydroxy-3-phenyl benzoic hydrazide hydrochloride

Methyl-2-hydroxy-3-phenyl benzoate was prepared by esterification of 2-hydroxy-3-phenyl benzoic acid with methanol using concentrated sulphuric acid catalyst. This ester (1.5 g.) was converted to its hydrazide by refluxing with hydrazine hydrate (2.0 ml.), water (2 ml.) and ethanol (25 ml.) for 12 hours. The reaction mixture was poured into water and the solid hydrazide which was filtered off was crystallized from chloroform/petroleum ether (boiling point 60°–80°C). It had a melting point of 192°–194°C and the following elemental analysis by weight:

|  | Found | Calculated for $C_{13}H_{12}N_2O_2$ |
|---|---|---|
| Carbon | 68.10% | 68.40% |
| Hydrogen | 5.40% | 5.30% |
| Nitrogen | 12.10% | 12.28% |

The above hydrazide in methanol was converted to its hydrochloride using dry HCl gas according to the procedure described in Example 2. It gave 2-hydroxy-3phenyl benzoic hydrazide hydrochloride, melting point 239°–242°C with decomposition which had the following elemental analysis by weight.

|  | Found | Calculated for $C_{13}H_{13}N_2O_2Cl$ |
|---|---|---|
| Carbon | 58.73% | 58.98% |
| Hydrogen | 5.13% | 4.95% |
| Nitrogen | 10.77% | 10.59% |
| Chlorine | 13.82% | 13.40% |

EXAMPLE 17

2Hydroxy-5-cyclopentyl benzoic hydrazide hydrochloride

To a mixture of methyl salicylate (30.4 g., 0.2 ml.) and methanol (20 ml.) was added concentrated sulphuric acid at such a rate that the temperature of the mixture was kept below 25°C. Cyclopentanol (17.2 g., 0.2 ml.) was added slowly and the mixture was then stirred vigorously at room temperature for 12 hours. The reaction mixture was poured on to ice/water, shaken with ether and the ethereal extracts were washed with water, sodium bicarbonate solution, water and finally dried over magnesium sulphate. Removal of the solvent gave a brown oil 34.4 g.) which was distilled under reduced pressure. Pure methyl-2-hydroxy-5-cyclopentyl benzoate (8.4 g.), which had a boiling point of 168°–172°C. at 10 mm. Hg. pressure, and pure methyl-2-hydroxy-3,5-dicyclopentyl benzoate (4.6 g.) which had a boiling point of 218°–224°C at 10 mm. Hg. pressure were obtained. Methyl-2-hydroxy-5-cyclopentyl benzoate (8.3 g.) was converted to the hydrazide using hydrazine hydrate (8.5 ml.), water (8.5 ml.) and ethanol (50 ml.) under reflux for 12 hours. The crude hydrazide obtained was crystallised from chloroform and petroleum ether (boiling range 60°–80°C), and had a melting point of 154°–155°C and the following elemental analysis by weight:

|  | Found | Calculated for $C_{18}H_{16}N_2O_2$ |
|---|---|---|
| Carbon | 65.30% | 65.43% |
| Hydrogen | 7.37% | 7.32% |
| Nitrogen | 12.44% | 12.72% |

The above hydrazide in ether was converted to its hydrochloride using dry HCl gas according to the procedure in Example 2. It gave 2-hydroxy-5-cyclopentyl benzoic hydrazide hydrochloride, melting point 305°–309°C with decomposition and had the following elemental analysis by weight.

|  | Found | Calculated for $C_{12}H_{17}N_2O_2Cl$ |
|---|---|---|
| Carbon | 56.34% | 56.13% |
| Hydrogen | 6.80% | 6.68% |
| Nitrogen | 10.99% | 10.91% |
| Chlorine | 13.49% | 13.81% |

EXAMPLE 18

2Hydroxy-3,5-dicyclopentyl benzoic hydrazide hydrochloride

Methyl-2-hydroxy-3,5-dicyclopentyl benzoate (4.5 g.), obtained from the reaction described in Example 17 was converted to its hydrazide in a similar manner. It gave the pure hydrazide (3.1 g.) which had a melting point of 121°–122°C after recrystallisation from chloroform/petroleum ether (boiling range 60°–80°C) and the following elemental analysis by weight:

|  | Found | Calculated for $C_{17}H_{24}N_2O_2$ |
|---|---|---|
| Carbon | 71.06% | 70.80% |
| Hydrogen | 8.69% | 8.39% |
| Nitrogen | 10.00% | 9.72% |

The above hydrazide in ether was converted to its hydrochloride using dry HCl gas according to the procedure described in Example 2. It gave 2-hydroxy-3,5-dicyclopentyl benzoic hydrazide hydrochloride, melting point 175°–182°C with decomposition which has the following element analysis by weight.

|  | Found | Calculated for $C_{17}H_{25}N_2O_2Cl$ |
|---|---|---|
| Carbon | 62.83% | 62.85% |
| Hydrogen | 7.78% | 7.76% |
| Nitrogen | 8.65% | 8.63% |
| Chlorine | 10.63% | 10.92% |

EXAMPLE 19

2-Hydroxy-3-methyl-5-($\alpha\alpha$-dimethyl benzyl) benzoic hydrazide hydrochloride Methyl 2-hydroxy-3-methyl benzoate was obtained by esterification of 2-hydroxy-3-methyl benzoic acid (cresotinic acid) using methanol and sulphuric acid catalyst. Alkylation of this ester (16.6 g., 0.1 m.) in methanol (15 ml.) and concentrated sulphuric acid catalyst (35 ml.) using $\alpha$-methyl styrene (11.8 g., 0.1 m.) gave a brown oil (21.6 g.). Distillation under reduced pressure gave pure methyl 2-hydroxy-3-methyl-5-($\alpha\alpha$-dimethylbenzyl) benzoate (13.9 g.) which has a boiling point of 160°–170°C at 0.7 mm. Hg. pressure. This was converted to its hydrazide in the usual way. The hydrazide which was crystallized from benzene had a melting point of 159°–161°C and had the following elemental analysis by weight:

|  | Found | Calculated for $[C_{17}H_{20}N_2O_2]_2 + C_6H_6$ |
|---|---|---|
| Carbon | 74.30% | 74.30% |
| Hydrogen | 7.12% | 7.12% |
| Nitrogen | 8.52% | 8.67% |

The above hydrazide in methanol was converted to its hydrochloride using dry HCl gas according to the procedure described in Example 2. It gave 2-hydroxy-3-methyl-5-($\alpha\alpha$-dimethylbenzyl) benzoic hydrazide hydrochloride, melting point 196°–208°C which had the following elemental analysis by weight:

|  | Found | Calculated for $C_{17}H_{21}N_2O_2Cl$ |
|---|---|---|
| Carbon | 63.62% | 63.64% |
| Hydrogen | 6.70% | 6.60% |
| Nitrogen | 8.67% | 8.73% |
| Chlorine | 10.85% | 11.05% |

EXAMPLE 20

2-Hydroxy-3-methyl-5-cyclopentyl benzoic hydrazide hydrochloride

Methyl 2-hydroxy-3-methyl benzoate (16.6 g., 0.1 m.) was alkylated with cyclopentanol (8.6 g., 0.1 m.) in methanol (15.0 ml.) and concentrated sulphuric acid (35.0 m.) at room temperature during 3–4 hours. A brown oil (19.1 g.) was obtained which on distillation gave pure methyl 2-hydroxy-3-methyl-5-cyclopentyl benzoate (12.4 g.) which has a boiling point of 150°–151°C. at 1.5 mm. Hg. pressure. This ester gave a hydrazide melting point 150°–152°C. on recrystallisation from chloroform/petroleum ether, which had the following elemental analysis by weight:

|  | Found | Calculated for $C_{13}H_{18}N_2O_2$ |
|---|---|---|
| Carbon | 66.88% | 66.64% |
| Hydrogen | 7.89% | 7.74% |
| Nitrogen | 11.88% | 11.96% |

The above hydrazide was dissolved in ether and dry HCL gas was passed through the solution for five minutes. The solvent was removed to give a white solid, 2-hydroxy-3-methyl-5-cyclo-pentylbenzoic hydrazide hydrochloride, melting point 215°C., which had the following elemental analysis by weight:

|  | Found | Calculated for $C_{13}H_{19}N_2O_2Cl$ |
|---|---|---|
| Carbon | 57.83% | 57.65% |
| Hydrogen | 7.23% | 7.07% |
| Nitrogen | 10.10% | 10.35% |
| Chlorine | 13.26% | 13.11 |

EXAMPLE 21

2-Hydroxy-3-methyl-5-sec-butylbenzoic hydrazide hydrochloride

Example 20 was repeated, except that the cyclopentanol was replaced by sec-butanol, 2-hydroxy-3-methyl-5-sec-butyl benzoic hydrazide, having a melting point of 126°–127°C and the following elemental analysis by weight, was obtained:

|  | Found | Calculated for $C_{12}H_{18}N_2O_2$ |
|---|---|---|
| Carbon | 64.73% | 64.86% |
| Hydrogen | 8.32% | 8.10% |
| Nitrogen | 12.56% | 12.61% |

The hydrazide was converted into its hydrochloride by the method of Example 20. The hydrochloride has a melting point of 191°–196°C and the following elemental analysis by weight:

|  | Found | Calculated for $C_{12}H_{19}N_2O_2Cl$ |
|---|---|---|
| Carbon | 55.62% | 55.70% |
| Hydrogen | 7.42% | 7.40% |
| Nitrogen | 10.70% | 10.83% |
| Chlorine | 13.30% | 13.70% |

EXAMPLE 22

3-Hydroxy-2-naphthoic hydrazide sulphate

3-Hydroxy-2-naphthoic acid 94.0 g) was esterified by heating for 8 hours under reflux with methanol (207 ml) and concentrated sulphuric acid (14 ml). The methyl ester had a melting point of 72°–73°C. It was converted to the hydrazide in the usual manner. The hydrazide was isolated as a cream coloured solid, melting point 200°–203°C. The hydrazide (0.5 g) was dissolved in ethyl acetate (150 ml) and gaseous hydrogen chloride was passed into the stirred solution for 30 minutes. A turbid solution was obtained which was evaporated to dryness under reduced pressure leaving an off-white solid, melting point 238°–240°C with decomposition.

EXAMPLE 23

2-Hydroxy-mono($C_{16}$–$C_{18}$ alkyl) benzoic hydrazide sulphate

A monoalkyl substituted salicylic acid mixture containing $C_{16}$–$C_{18}$ alkyl groups (72.4 g), prepared by carboxylation of the corresponding phenol, was esterified by heating with methanol (80 ml) in the presence of concentrated sulphuric acid (10 ml). A portion of the crude ester, a dark brown oil, (18.8 g) was heated under reflux overnight with hydrazine hydrate (10 ml), water (10 ml) and ethanol (50 ml). The hydrazide, a viscous brown oil (19.0 g) was mixed with 500 ml petrol (boiling range) 80°–100°C and was stirred overnight with 200 ml sulphuric acid (concentration 150 g/l). Removal of the petrol phase and evaporation gave the crude hydrazide sulphate (14.4 g) as a viscous brown oil.

EXAMPLE 24

2-Hydroxy mixed 5-octyl and 3,5-dioctylbenzoic hyrazide sulphates

Methyl salicylate (7.6 g), methanol (10.0 ml) and concentrated sulphuric acid (35.0 ml) were mixed and cooled to 15°C. Octene-1 (16.8 g) was added at this temperature over a period of 2 hours and the mixture was stirred for a further 18 hours at room temperature. The reaction mixture was worked up in the usual way and the low boiling products were stripped off under reduced pressure (10 mm. Hg.) at 100°C. A brown oil which contained methyl monooctyl- and dioctyl-2-hydroxybenzoates (GLC/MS analysis) was obtained. This oil was converted to the mixed hydrazide (brown oil) and then to the mixed sulphate (brown waxy solid) by the procedure described in Example 1.

EXAMPLE 25

2-Hydroxy-3,5-di-($C_6$–$C_7$ mixed alkylbenzoic)hydrazide sulphate

Methyl salicylate (15.2 g), methanol (20 ml) and concentrated sulphuric acid (70.0 ml) were mixed and cooled to 10°C. A $C_6$–$C_7$ alpha-olefin mixture (28.0 g) was added over 2 hours and the mixture was stirred for a further 48 hours at 15°C. The reaction mixture was worked up to give a brown oil (33.4 g). This oil was stripped of low boilers at 100° at 10 mm. Hg. pressure. A sample of this oil (10 g) was further stripped of monoalkylation products at 140°C at 0.2 mm. Hg pressure and the residual oil which contained mixed isomers of $C_6$–$C_7$ dialkylated products was converted to the hydrazide and hydrazide sulphate (brown wax) by the procedure described in Example 1.

EXAMPLE 26

Mixed mono-($C_6$–$C_7$ alkyl) and di-($C_6$–$C_7$ alkyl)-2-hydroxybenzoic hydrazide sulphates A sample of the oily alkylation product obtained in Example 25 after stripping at 100°C at 10 mm. Hg. pressure was found to contain mono- and dialkylated products where the substituents are mixed isomers of both $C_6$ and $C_7$ alkyl groups (GLC/MS). This oil (10 g) was converted to the mixed hydrazide (brown oil) and mixed hydrazide sulphates (brown wax) by the procedure described in Example 1.

EXAMPLE 27

2-Hydroxy-3-methyl-5-dodecylbenzoic hydrazide sulphate

Methyl 2-hydroxy-3-methylbenzoate (33.2 g., 0.2 m) in methanol (20 ml) was alkylated with propylene tetramer (50 g) in the presence of concentrated sulphuric acid catalyst (90 ml). A brown oil (80.9 g) was obtained. Distillation of a portion of the brown oil (43 g) gave methyl 2-hydroxy-3-methyl-5-dodecylbenzoate (20.5 g) which had a boiling range of 136°–146°C at 0.8 mm. Hg. pressure. The brown oil (37 g) was heated under reflux with hydrazine hydrate (20 ml), water (20 ml) and ethanol (100 ml), for 10 hours. The hydrazide (32.8 g) was isolated as a brown viscous oil. It was converted to its sulphate by stirring its solution in 200 ml petrol (boiling range 80°–100°C) with 20% w/v sulphuric acid solution (300 ml). The hydrazide sulphate (33 g) was obtained as a brown viscous oil and was used without further purification for copper extraction.

EXAMPLE 28

Hydrazide sulphate derived from the alkylation product of methyl salicylate and 2-ethylhexanol 2-Ethylhexanol (325 g, 2.5 m) was added dropwise to a stirred solution of methyl salicylate (152 g, 1.0 m), methanol (40 g) and concentrated sulphuric acid (490 ml). The reaction mixture was stirred overnight at room temperature. It was then poured into water extracted with ether and the ethereal extract washed with water. The ether was removed and the residue was heated at 100°C at 12 mm. Hg. pressure for 2 hours to remove low boiling material. A brown viscous oil (375 g) was obtained. GLC/MS analysis showed that the oil contained a mixture of mono- and di-alkylated methyl salicylates. The oil (27.6 g) was converted to its hydrazide by heating under reflux with hydrazine hydrate (20 ml), water (20 ml) and ethanol (100 ml) for 10 hours. The hydrazide mixture (29.6 g) was isolated as a brown viscous oil. It was converted to its sulphate by stirring its solution in petrol (boiling range 80°–100°C) (200 ml) with 20% w/v sulphuric acid solution (400 ml). The hydrazide sulphate mixture (24.0 g) was obtained as a brown viscous oil and was used without further purification for copper extraction.

EXAMPLE 29

Comparison of the selectivity of extraction of copper from copper-iron solutions with hydrazide and hydrazide sulphate An aqueous solution (pH2) containing $Cu^{++}$ (4.0 g/l) and $Fe^{+++}$ (3.6 g/l) was shaken six times with an equal volume of a 2% w/v solution of a mixture of 2-hydroxy-3-sec-butyl-5-(1,1,5-trimethylhexyl)benzoic hydrazide and 2-hydroxy-3-(1,1,5-trimethylhexyl)-5-sec-butylbenzoic hydrazide, and a 2% w/v solution of the sulphates thereof in kerosene. The pH and concentration of $Cu^{++}$ and $Fe^{+++}$ remaining in the aqueous phase after each extraction were measured and the results are shown in Table I.

The kerosene used in this Example was distilled before use and contained some ketones in an amount equivalent to 0.20% w/v calculated as >C = O (molecular weight 28.01).

TABLE I

|  | contact | pH | $Cu^{++}$ g/l | $Fe^{++}$ g/l |
|---|---|---|---|---|
| hydrazide of Example 5 | 0 (blank) | 2.0 | 4.0 | 3.6 |
|  | 1 | 1.88 | 2.9 | 3.2 |
|  | 2 | 1.81 | 1.9 | 3.0 |
|  | 3 | 1.65 | 0.9 | 2.8 |
|  | 4 | 1.61 | 0.2 | 2.6 |
|  | 5 | 1.55 | 0.05 | 2.2 |
|  | 6 | 1.49 | 0.03 | 1.6 |
| hydrazide sulphate of Example 5 | 0 (blank) | 2.0 | 4.0 | 3.6 |
|  | 1 | 1.61 | 3.0 | 3.6 |
|  | 2 | 1.33 | 2.0 | 3.6 |
|  | 3 | 1.16 | 1.1 | 3.6 |
|  | 4 | 1.11 | 0.5 | 3.6 |
|  | 5 | 1.08 | 0.4 | 3.6 |
|  | 6 | 1.00 | 0.01 | 3.6 |

It can be seen from Table I that while the free hydrazide does extract copper, it also extracts a comparatively large amount of iron, whereas the hydrazide sulphate extracts only the copper, leaving the iron still in the acid solution.

EXAMPLE 30

Use of Product of Example 5 for selective extraction of copper at low pH

Following the procedure of Example 29, aqueous solutions containing $Cu^{++}$ and $Fe^{+++}$ were shaken with a 1% w/v solution in kerosene of a mixture of 2-hydroxy-3-sec-butyl-5-(1,1,5-trimethylhexyl) benzoic hydrazide sulphate and 2-hydroxy-3-(1,1,5-trimethylhexyl)-5-sec-butyl benzoic hydrazide sulphate. The kerosene used in this Example was distilled before use and contained some ketones in an amount of equivalent to 0.2% w/v >C = O. Table II shows the results when the initial aqueous solution has a pH of 2 and Table III shows the results when the initial aqueous solution has a pH of 1.

It can be seen from Tables II and III that the hydrazide sulphate will extract copper from solutions of low pH values and at these levels still retains its selectivity for copper.

TABLE II

| contact | pH | $Cu^{++}$ g/l | $Fe^{+++}$ g/l |
|---|---|---|---|
| 0 (blank) | 2.0 | 4.0 | 3.6 |
| 1 | 1.71 | 3.4 | 3.6 |
| 2 | 1.49 | 2.6 | 3.6 |
| 3 | 1.35 | 2.3 | 3.6 |
| 4 | 1.29 | 1.7 | 3.6 |
| 5 | 1.13 | 1.2 | 3.6 |
| 6 | 1.05 | 0.7 | 3.6 |

TABLE III

| contact | pH | $Cu^{++}$ g/l | $Fe^{+++}$ g/l |
|---|---|---|---|
| 0 (blank) | 1.00 | 4.0 | 3.6 |
| 1 | 1.00 | 3.4 | 3.6 |
| 2 | 0.90 | 3.0 | 3.6 |
| 3 | 0.85 | 2.6 | 3.6 |
| 4 | 0.87 | 2.1 | 3.6 |
| 5 | 0.75 | 1.6 | 3.6 |
| 6 | 0.71 | 1.2 | 3.6 |

EXAMPLE 31

Effect of ketones on the extraction performance of the product of Example 5 in kerosene Aqueous acid solutions at original pH of 2, containing various amounts of $Cu^{++}$ were shaken with equal volumes of a 5% w/v solution of a mixture of 2-hydroxy-3-sec-butyl-5-(1,1,5-trimethylhexyl) benzoic hydrazide sulphate and 2-hydroxy-3-(1,1,5-trimethylhexyl)-5-sec-butyl benzoic hydrazide sulphate, in kerosene.

The extractions were repeated using, as solvent, kerosene containing the ketones stated below.

Tables IV to IX show that the extraction performance of the hydrazide sulphate mixture in kerosene containing a ketone, is superior to that of the hydrazide sulphate mixture in kerosene alone.

A. 5% w/v hydrazide sulphate in kerosene

TABLE IV

| $Cu^{++}$ solution before extraction conc. in g/l | % of $Cu^{++}$ extracted into organic phase |
|---|---|
| 8.2 | 10.6 |
| 6.0 | 9.3 |
| 3.9 | 18.0 |
| 2.0 | 24.0 |

B. 5% w/v hydrazide sulphate + 1.66% w/v methyl hexyl ketone in kerosene

TABLE V

| $Cu^{++}$ solution before extraction conc. in g/l | % of $Cu^{++}$ extracted into organic phase |
|---|---|
| 8.0 | 43.8 |
| 6.0 | 55.0 |
| 4.0 | 80.0 |
| 2.0 | 95.0 |

C. 5% w/v hydrazide sulphate in distilled kerosene containing ketones present in an amount equivalent to 0.2% w/v >C = O

TABLE VI

| $Cu^{++}$ solution before extraction conc. in g/l | % of $Cu^{++}$ extracted into organic phase |
|---|---|
| 8.2 | 36.6 |
| 6.0 | 50.0 |
| 3.9 | 69.2 |
| 2.0 | 80.0 |

D. 5% w/v hydrazide sulphate + 1.644% w/v acetophenone in kerosene

TABLE VII

| $Cu^{++}$ solution before extraction conc. in g/l | % of $Cu^{++}$ extracted into organic phase |
|---|---|
| 8.0 | 30.12 |
| 6.0 | 35.5 |
| 4.0 | 42.5 |
| 2.0 | 52.6 |

E. 5% w/v hydrazide sulphate + 2.497% w/v benzophenone in kerosene

TABLE VII

| $Cu^{++}$ solution before extraction conc. in g/l | % of $Cu^{++}$ extracted into organic phase |
|---|---|
| 8.0 | 25.3 |
| 6.0 | 33.9 |
| 4.0 | 47.5 |
| 2.0 | 63.5 |

F. 5% w/v hydrazide sulphate + 1.95% w/v di-isobutyl ketone in kerosene

TABLE IX

| $Cu^{++}$ solution before extraction conc. in g/l | % of $Cu^{++}$ extracted into organic phase |
|---|---|
| 8.0 | 37.3 |
| 6.0 | 46.8 |
| 4.0 | 65.0 |
| 2.0 | 89.5 |

EXAMPLE 32

Extraction and stripping using product of Example 27

An aqueous solution (pH 2) containing $Cu^{++}$ (3.5 g/l) and $Fe^{+++}$ (1.6 g/l) was shaken with an equal volume of a 5% w/v solution of the hydrazide sulphate, obtained in Example 27, in kerosene containing 2% w/v methyl hexyl ketone. The loaded organic phase was then shaken with an equal volume of 1.5 m sulphuric acid solution. This acid extraction was repeated. The stripped organic phase was then used to treat a second batch of the original copper-iron solution. This cycling procedure was repeated and the solutions were analysed at each stage for copper and iron. The results are illustrated in Table X.

TABLE X

| Run | % Metal extracted into organic phase | | % Extracted $Cu^{++}$ recovered from organic phase | |
|---|---|---|---|---|
| | $Cu^{++}$ | $Fe^{+++}$ | 1st Acid Strip | 2nd Acid Strip |
| 1 | 54.3 | 0 | 94.7 | 5.2 |
| 2 | 54.3 | 0 | 94.7 | 5.2 |
| 3 | 54.3 | 0 | 84.2 | 11.9 |
| 4 | 54.3 | 0 | 89.5 | 10.0 |
| 5 | 54.3 | 0 | 84.2 | 13.5 |
| 6 | 54.3 | 0 | 84.2 | 14.8 |

The results show the selectivity of the reagent for copper over iron; the ease of copper recovery from the loaded organic phase and the ability of the reagent to be recycled.

EXAMPLE 33

Extraction and stripping using product of Example 28

An aqueous solution (pH 2) containing $Cu^{++}$ (3.5 g/l) and $Fe^{+++}$ (2.4 g/l) was shaken with a 5% w/v solution of the hydrazide sulphate, obtained in Example 28, in kerosene containing 2% w/v methyl hexyl ketone. The procedure followed was as described in Example 32 and the results are given in Table XI.

TABLE XI

| Run | % Metal extracted into organic phase | | % $Cu^{++}$ recovered from organic phase | |
|---|---|---|---|---|
| | $Cu^{++}$ | $Fe^{+++}$ | 1st Acid Strip | 2nd Acid Strip |
| 1 | 54.3 | 0 | 98.3 | 1.6 |
| 2 | 54.3 | 0 | 96.5 | 3.0 |
| 3 | 54.3 | 0 | 94.7 | 4.8 |
| 4 | 54.3 | 0 | 94.7 | 4.8 |
| 5 | 54.3 | 0 | 97.5 | 2.1 |
| 6 | 54.3 | 0 | 94.7 | 4.8 |

EXAMPLE 34

Extraction of $Cu^{++}$ from a solution of $Cu^{++}/Fe^{+++}$ using 2-hydroxy-3-methyl-5-cyclopentylbenzoic hydrazide hydrochloride An aqueous solution (pH 2) containing copper$^{++}$ (4.0 g/l) and iron (3.4 g/l) was shaken four times with an equal volume of a 2% w/v solution of 2-hydroxy-3-methyl-5-cyclopentylbenzoic hydrazide hydrochloride in chloroform containing 12% w/v methyl hexyl ketone and 18% w/v capryl alcohol. The amount of $Cu^{++}$ and $Fe^{+++}$ extracted after each contact was measured and the results are shown in the Table XII.

TABLE XII

| Contact | pH | % $Cu^{++}$ extracted | % $Fe^{+++}$ extracted |
|---|---|---|---|
| 0 | 2.0 | — | — |
| 1 | 1.30 | 37.5 | 0.0 |
| 2 | 0.98 | 60.0 | 0.0 |
| 3 | 0.76 | 72.5 | 0.0 |
| 4 | 0.62 | 80.0 | 0.0 |

EXAMPLE 35

Extraction of $Cu^{++}$ from a solution of $Cu^{++}/Fe^{+++}$ using 2-hydroxy-4-n-hexoxybenzoic hydrazide hydrochloride An aqueous solution (pH 2) containing copper (3.7 g/l) and iron (3.0 g/l) was shaken three times with an equal volume of a 2% w/v solution of 2-hydroxy-4-n-hexoxybenzoic hydrazide hydrochloride in capryl alcohol containing 44% methyl hexyl ketone. The amount of $Cu^{++}$ and $Fe^{+++}$ extracted after each contact was measured and the results are shown in Table XIII.

TABLE XIII

| Contact | equilibrium pH | % $Cu^{++}$ extracted | % $Fe^{+++}$ extracted |
|---|---|---|---|
| 0 (blank) | 2.0 | — | — |
| 1 | 1.32 | 11.0 | 0.0 |
| 2 | 1.11 | 22.8 | 0.0 |
| 3 | 0.88 | 35.3 | 0.0 |

EXAMPLE 36

Effect of various phosphorus and sulphur compounds on the extraction performance of the product of Example 5

An aqueous acid solution at original pH 2 containing 7.6 g/l $Cu^{++}$ was shaken with an equal volume of a 5% w/v solution of a mixture of 2-hydroxy-3-sec-butyl-5-(1,1,5-trimethylhexyl) benzoic hydrazide sulphate and 2-hydroxy-3-(1,1,5-trimethylhexyl)-5-sec-butylbenzoic hydrazide sulphate in kerosene. The extraction was repeated using, as solvent, kerosene containing the phosphorus and sulphur containing compounds listed below. The amounts of copper extracted into the organic phase were measured and the results are shown in Table XIV below.

TABLE XIV

| Solvent | % Cu++ extracted into the organic phase |
| --- | --- |
| kerosene | 10.2 |
| kerosene + 3.5% w/v tri-n-butyl phosphate | 23.7 |
| kerosene + 4.16% w/v tri-phenyl phosphate | 23.7 |
| kerosene + 3.28% w/v di-n-butyl phosphite | 26.3 |
| kerosene + 2.32% w/v di-n-butyl sulphone | 25.0 |
| kerosene + 1.76% w/v tetrahydrothiophene-1,1-dioxide (sulpholane) | 18.7 |

EXAMPLE 37

Extraction of copper from ammonical copper sulphate solution using product of Example 5

An aqueous solution containing $Cu^{++}$ (9.14 g/l), 27% ammonium hydroxide solution (34.5 g/l) and ammonium carbonate (20.0 g/l), having an initial pH of 9.24, was shaken with a 5% w/v solution of a mixture of 2-hydroxy-3-sec-butyl-5-(1,1,5-trimethylhexyl) benzoic hydrazide sulphate and 2-hydroxy-3-(1,1,5-trimethylhexyl)-5-sec-butylbenzoic hydrazide sulphate in kerosene. The extractions were carried out using various organic:aqueous volume phase ratios. The percentage of copper extracted into the organic phase after each extraction is shown in Table XV.

TABLE XV

| Organic:aqueous phase ratio | % of Cu++ extracted into organic phase |
| --- | --- |
| 1 | 66.7 |
| 2 | 99.9 |
| 0.5 | 28.9 |

EXAMPLE 38

Extraction of nickel from alkaline solution

An aqueous solution containing $Ni^{++}$ (6.4 g/l) and sodium sulphate (71 g/l), having an initial pH of 7.1, was shaken with an equal volume of a 5% w/v kerosene solution of the hydrazide sulphates used in Example 37. The percentage of $Ni^{++}$ extracted into the organic phase was 50%.

EXAMPLE 39

Extraction of cobalt from alkaline solution

An aqueous solution containing $Co^{++}$ (6.0 g/l) and sodium sulphate (71 g/l) was shaken with an equal volume of a 5% w/v kerosene solution of the hydrazide sulphates used in Example 37. The pH of the $Co^{++}$ solution before extraction was adjusted by addition of ammonium hydroxide solution. The percentage of $Co^{++}$ extracted into the organic phase after each extraction is shown in Table XVI.

TABLE XVI

| Initial pH | % of Co++ extracted into organic phase |
| --- | --- |
| 7.16 | 26.7 |
| 7.92 | 56.7 |
| 11.57 | 99.9 |

What we claim is:

1. A compound having the formula I

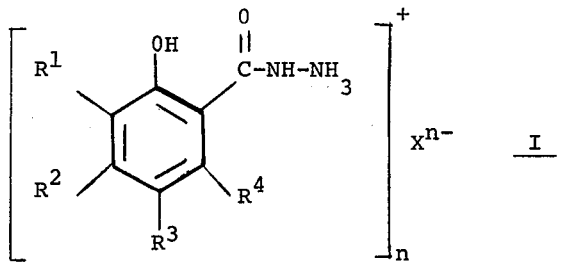

in which $R^1$, $R^2$, $R^3$, and $R^4$ may be the same or different and each represent hydrogen; a straight or branched chain alkyl radical having 1 to 20 carbon atoms; an aralkyl radical having 7 to 20 carbon atoms which may be substituted by one or more alkyl groups having 1 to 4 carbon atoms; or may be

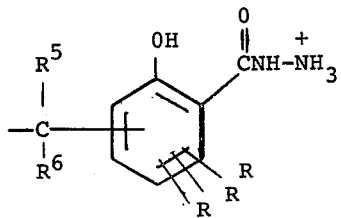

wherein $R^5$ and $R^6$ are each a hydrogen atom or a methyl group, and each R represents the others of $R^1$, $R^2$, $R^3$ and $R^4$; an alkenyl radical having 2 to 20 carbon atoms; a cycloalkyl radical having 5 to 12 carbon atoms which may be substituted by one or more alkyl groups having 1 to 4 carbon atoms; an aryl radical having 6 to 10 carbon atoms; an alkaryl radical having 7 to 12 carbon atoms; a cyclohexenyl alkyl radical in which the alkyl moiety has 2 or 3 carbon atoms and the cyclohexenyl ring may contain a methyl group as substituent; an alkenyl cyclohexyl radical in which the alkenyl moiety has 2 or 3 carbon atoms and the cyclohexyl ring may also contain a methyl group as substituent; or a group $-OR^7$ wherein $R^7$ represents an alkyl radical having 1 to 20 carbon atoms, a cycloalkyl radical having 5 to 12 carbon atoms, optionally substituted by one or more alkyl groups having 1 to 4 carbon atoms, an aryl radical having 6 to 10 carbon atoms or an alkenyl radical having 3 to 20 carbon atoms; or any two adjacent radicals $R^1$, $R^2$, $R^3$ and $R^4$ may be joined together to form an aryl ring which may be substituted by one or more alkyl groups having 1 to 20 carbon atoms; and with the proviso that the total number of carbon atoms of $R^1$, $R^2$, $R^3$ and $R^4$ are more than 8; X represents an anion; and n is the valency of X.

2. A compound as claimed in claim 1 in which $R^2$ and $R^4$ are both hydrogen.

3. A compound as claimed in claim 1 in which X is derived from a mineral acid.

4. A compound as claimed in claim 3 in which X is $SO_4^{--}$ or $Cl^-$.

5. A compound having the formula I

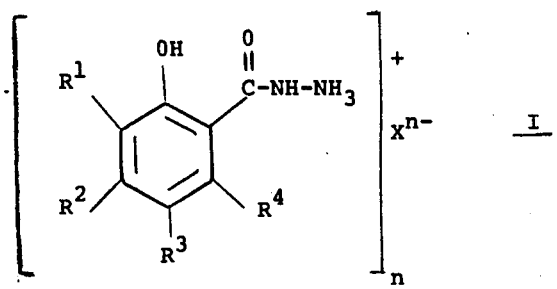

in which $R^1$, $R^2$, $R^3$ and $R^4$ may be the same or different and each represent hydrogen; a straight or branched chain alkyl radical having 1 to 20 carbon atoms, an aralkyl radical having 7 to 20 carbon atoms, an alkenyl radical having 2 to 20 carbon atoms, a cycloalkyl radical having 5 to 12 carbon atoms, an alkoxy radical having 1 to 20 carbon atoms or an aryl radical having 6 to 10 carbon atoms, and with the proviso that the total number of carbon atoms of $R^1$, $R^2$, $R^3$ and $R^4$ are more than 8; X represents an anion and n is the valency of X.

6. A compound as claimed in claim 5 in which $R^2$ and $R^4$ are both hydrogen.

7. A compound as claimed in claim 5 in which X is derived from a mineral acid.

8. A compound as claimed in claim 7 in which X is $SO_4^{--}$ or $Cl^-$.

9. A compound as claimed in claim 1 in which besides the definitions of $R^1$, $R^2$, $R^3$, $R^4$ and $R^7$ given in claim 1 at least one of $R^1$, $R^2$, $R^3$ and $R^4$ is cycloalkenyl with 5 to 12 carbon atoms which may be substituted by one or more alkyl groups having 1 to 4 carbon atoms, and/or $R^7$ is an aryl radical having 6 to 10 carbon atoms and substituted by alkyl with 1 to 4 carbon atoms, or is aralkyl.

10. A compound as claimed in claim 5 in which besides the definitions of $R^1$, $R^2$, $R^3$ and $R^4$ given in claim 7 at least one of $R^1$, $R^2$, $R^3$ and $R^4$ is cycloalkenyl with 5 to 12 carbon atoms which may be substituted by one or more alkyl groups having 1 to 4 carbon atoms.

11. A compound according to claim 5 wherein $R^2$ and $R^4$ are each hydrogen; $R^1$ and $R^3$ are the same or different and each represent hydrogen, alkyl of 1 to 18 carbon atoms, $\alpha,\alpha$-dimethylbenzyl, alkenyl of 3 to 12 carbon atoms, phenyl, alkoxy of 3 to 18 carbon atoms or cycloalkyl of 5 to 8 carbon atoms; and where the total number of carbon atoms of $R^1$ plus $R^3$ are 9 to 30; X represents chloride or sulfate; and n is 1 or 2.

* * * * *